United States Patent
Blow et al.

(10) Patent No.: US 6,369,921 B1
(45) Date of Patent: Apr. 9, 2002

(54) PARITY DETERMINING APPARATUS AND METHOD

(75) Inventors: Keith James Blow; Alistair James Poustie; Robert John Manning, all of Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/623,320
(22) PCT Filed: Mar. 17, 1999
(86) PCT No.: PCT/GB99/00806
 § 371 Date: Aug. 31, 2000
 § 102(e) Date: Aug. 31, 2000
(87) PCT Pub. No.: WO99/49600
 PCT Pub. Date: Sep. 30, 1999

(30) Foreign Application Priority Data

Mar. 24, 1998 (GB) .............................. 9806283

(51) Int. Cl.[7] .......................... G06E 1/04; H04B 10/08; H04L 1/00
(52) U.S. Cl. .................. 359/107; 359/110; 359/900
(58) Field of Search ................... 359/107, 108, 359/110, 900

(56) References Cited

U.S. PATENT DOCUMENTS 4,900,115 A * 2/1990 Heuring et al. ............. 359/108
5,155,779 A * 10/1992 Avramopoulos et al. .... 359/107

FOREIGN PATENT DOCUMENTS

| FR | 2616245 | * 12/1988 | |
| GB | 2217944 A | 11/1989 | |
| JP | 406095181 A | * 4/1994 | ................. 359/107 |
| WO | WO 99 14649 A | 3/1999 | |

OTHER PUBLICATIONS

Hall et al, "All-Optical Bit Pattern Generation and Matching", Electronics Letters, vol. 32, No. 13, Jun. 20, 1996, pp. 1214–1215.

* cited by examiner

Primary Examiner—Cassandra Spyrou
Assistant Examiner—John Juba, Jr.
(74) Attorney, Agent, or Firm—Nixon & Vanderhye P.C.

(57) ABSTRACT

A parity determining circuit is used to determine the parity of a binary word. The binary word is represented by a sequence of optical bit slots. Each bit slot defines a respective one of two complementary logical states. The circuit includes: an input pulse stream generator that generates copies of the binary word; a combining device that receives two binary words, offsets one word with respect to the other, and then combines them to form a combination word; and a circuit that applies a copy of the original binary word together with the combination word to the combining device a number of times in succession. This results in a combination word that has a number of bits in the same logical state and that indicates the parity of the binary word.

23 Claims, 4 Drawing Sheets

PARITY DETERMINING APPARATUS AND METHOD

BACKGROUND TO THE INVENTION

The present invention relates to apparatus and a method for determining the parity of an optical binary word, the binary word being represented by a sequence of W optical bit slots.

In the field of all optical processing, optical signal streams are used for data processing applications. These optical streams consist of an optical pulse train that is divided into a series of bit slots. Each bit slot, which has a predetermined length within the pulse train, represents a single bit of data, with the presence or absence of an optical pulse within a bit slot representing complementary logical states.

Thus, for example, the presence of a pulse may represent a binary "1", whilst the absence of an optical pulse may represent a binary "0", or vice versa. In this specification, therefore, we use the terminology "optical binary word" to mean a binary word represented optically in this manner.

One of the basic optical processing applications which is required is the ability to determine the parity of an optical binary word. The parity of an optical binary word represents the presence of optical pulses in the bit slots of the binary word. The parity is represented in the form of a parity word whose logical state changes if there is an optical pulse in the corresponding bit slot of the binary word.

Such parity words are frequently used in error checking and correction systems. In such systems, a check sum is provided within the packet which is compared to a parity word determined by counting the parity of bit slots within the data packet. Any difference in the result of this comparison then indicates that an error has occurred during transfer of the packet such that either correction or re-transmission of the data packet is required.

A further use of parity words is the identification of rogue packets on a data network. In networks in which data is transferred in data packets, it is a common problem that incorrectly addressed packets continue to propagate around the network indefinitely. One possible way around this problem is to only use addresses with even (or odd) parity and then eliminate all packets which have an address of the opposite parity. The parity of the address, which is contained in a packet header, is then determined from the parity word corresponding to the packet header, allowing all packets which have an address of the incorrect parity to be eliminated.

SUMMARY OF THE INVENTION

According to a first aspect of the present invention, we provide parity determining apparatus for determining the parity of a binary word, the binary word being represented by a sequence of W optical bit slots, each bit slot defining a respective one of first and second complementary logical states, the apparatus comprising an input pulse stream generator which generates copies of the W bit slot word; a combining means which receives first and second binary words, offsets the first and second binary words by one bit slot and combines the relatively offset first and second binary words to form a combination word; and, means for applying P times in succession a copy of the W bit slot binary word and the previously generated combination word to combining means, whereby the parity of the first P bit slots of the W bit slot word are given by the first P bit slots of the resultant combination word, the first combination word comprising a sequence of optical bit slots having the same logical state.

According to a second aspect of the invention, we provide a method for determining the parity of a binary word, the binary word being represented by a sequence of W optical bit slots, each bit slot defining a respective one of first and second complementary logical states, the method comprising generating copies of the W bit slot word; forming a combination word from first and second binary words by offsetting the first and second binary words by one bit slot and combining the relatively offset first and second binary words; and, forming the combination word P times in succession from a copy of the W bit slot binary word and the previously generated combination word, whereby the parity of the first P bit slots of the W bit slot word are given by the first P bit slots of the resultant combination word, the first combination word comprising a sequence of optical bit slots having the same logical state.

We have designed a method and apparatus for determining the parity of a binary word. The parity of the binary word is determined for each bit slot of the binary word by combining a copy of the binary word with a copy of the binary word offset by one bit slot, to form a combination word.

The combination word is then offset by a single bit slot and again combined with a copy of the binary word. This is then repeated with the newly formed combination word being offset and combined with a copy of the binary word. If P different copies of the original binary word are utilised in the combinations, the final combination word generated will show the parity of the first P bit slots of the original word.

Accordingly the present invention provides a method and apparatus for determining the parity of an all optical binary word using only optical processing. This is in contrast to systems of the prior art which require non-optical processing in order to successfully determine the parity of data words. The use of such non-optical techniques results in a greater processing time and overly complicated apparatus.

Preferably, the input pulse stream generator generates an input optical pulse stream comprising the W optical bit slot word repeated at intervals of L bit slots.

Preferably, the combining means comprises an optical combiner having first and second combiner inputs, and a combiner output which generates a combined optical signal stream representing the combination of optical bit slots applied to the first and second combiner inputs respectively; and, an L+1 bit slot delay line, wherein the combiner output is coupled to the second combiner input via the L+1 bit slot delay line, and wherein the input optical pulse stream is applied to the first optical combiner input.

Alternatively an L−1 bit slot delay line could be used instead of the L+1 bit slot delay line. This is due to the requirement being that the W bit slot binary word and the combination binary word are offset by a single bit slot, the order of offset being irrelevant.

Whereas the above system using a single optical combiner uses feedback to achieve the repeated combination of the combination word and a copy of the binary word, it is also possible to use multiple optical combiners, with the output of one combiner coupled to the second input of a subsequent "downstream" combiner. By applying copies of the W bit slot word to the first input of the subsequent "downstream" combiners at the appropriate times, the parity word can be determined.

In order that timing be maintained, it is necessary for the copy of the W bit slot word to arrive offset by one bit slot with respect to the copy of the combination word. The offset may be achieved by having the N bit slot word arrive one bit slot before or one bit slot after the combination word. This could be achieved by supplying the input optical pulse stream comprising the W optical bit slot word repeated at intervals of L bit slots, to the first combiner input of each combiner. An L+1 bit slot delay line or alternatively an L−1 bit slot delay line is then located between the output of one combiner and the second input of the subsequent downstream combiner thereby introducing the one bit slot offset.

The use of the W bit slot word repeated at intervals of L bit slots in conjunction with either the L+1 or L−1 bit slot delay line is particularly advantageous as it allows the single bit slot offset to be achieved without the need for a single bit slot delay, which is difficult to achieve at high bit flow rates.

For ease of discussion, the remainder of the specification will discuss the example in which the W bit slot word arrives prior to the combination word. Accordingly, all the examples use an L+1 bit slot delay line, although it will be realised that an L−1 bit slot delay line could be used.

Typically the combining means includes an optical pulse source which generates optical pulses in successive bit slots, each optical pulse representing a logical state and, an all optical non-linear gate. These are used to ensure the combination signal stream generated by the combiner does not have more than one optical pulse in any bit slot.

Typically, the non-linear gate comprises a gate input coupled to the optical pulse source, a gate output, coupled to the L+1 bit slot delay line, which generates a gate output stream, and, a gate switching input coupled to the combiner output. In this case the application of a switching signal to the gate switching input selectively switches a connection between the gate input and the gate output so as to change the logical state of the gate output stream for a time interval corresponding to a single bit slot. However, any suitable non-linear gate could be used.

If the above mentioned non-linear gate is used, the combined optical signal stream acts as a series of switching signals such that the gate output stream is a copy of the combined signal stream.

Preferably the input pulse stream generator comprises an optical word generator which generates the W bit slot word, and, an L bit regenerative memory having a memory word input which is coupled to the optical word generator to receive the W bit slot word to be stored, and a memory word output which generates the input optical pulse stream. The regenerative memory provides a simple method of reliably generating a repeating optical bit slot sequence from a single original copy, without the need for having additional copies of the original word.

Typically the apparatus also includes an optical pulse source which generates optical pulses in successive bit slots, the L bit regenerative memory having an input coupled to the optical pulse source which receives the generated optical pulses. However, alternative pulse stream sources, such as a window generator may be used to produce optical signal streams lacking optical bit slots. Such signal streams can be used to reset the memory as required.

Although a system in which L=0 could be implemented, this would require the production of a bit slot delay line having a single bit slot delay which is difficult to achieve at high bit flow rates. Accordingly, it is preferable that L≧W.

To further improve functioning of the device and increase the number of bit slots of the W bit slot binary word for which the parity can be determined, it is preferable that when an L+1 bit slot delay line is used L≧W+P−2 and that when an L−1 bit slot delay line is used L≧W+P−1. In general however, L will be much larger than P or W and this allows the parity word to recirculate in the feedback loop, formed by the combining means and the L+1 (or L−1) bit slot delay line, without the parity being rendered incorrect due to combination with a subsequently input W bit slot binary word.

Typically the switching signals used to switch the non-linear gate are a single optical pulse in a bit slot.

Typically a bit slot having the second logical state contains a single optical pulse.

Typically, the first combination word comprises a sequence of optical bit slots having the first logical state.

BRIEF DESCRIPTION OF THE DRAWINGS

Examples of the present invention will now be described with reference to he accompanying drawings, in which.

DESCRIPTION OF EXAMPLES

In order that the invention be understood, certain symbols have been used in the Figures relating to the description. These symbols are shown in FIGS. 1a to 1d and their meanings will now be discussed.

Figure 1A:
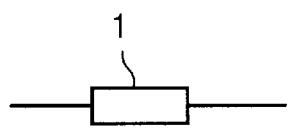
FIG. 1a shows a schematic representation of a delay line.

FIG. 1a shows a delay line 1 which operates to delay the transfer of an optical pulse stream applied at one end of the delay line 1 to the other end, by a predetermined time interval. This time interval usually corresponds to a predetermined number of bit slots. The delay is achieved using either a length of optical fibre, a silica plane waveguide, or a free space path, or the like, such that the optical pulse takes a predetermined amount of time to travel the length of the element.

The length of delay on a delay line will depend upon the physical length of the waveguide, free space path, or optical fibre used and also the refractive index of the particular transmission media (which will effect the speed of light within the media).

Figure 1B:
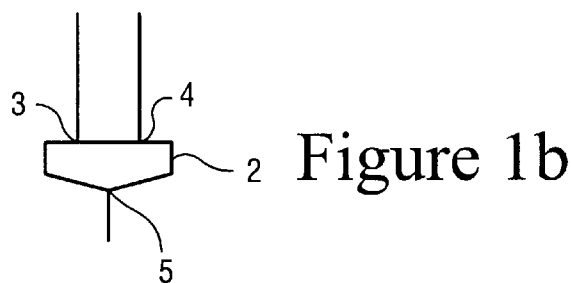
FIG. 1b shows a schematic representation of an optical combiner.

FIG. 1b shows an all optical combiner 2 which has two combiner inputs 3, 4 and a combiner output 5. The combiner 2 combines two optical pulse streams applied to the two combiner inputs 3, 4 in a way that avoids interferometric mixing of pulses.

In practice this is usually achieved by having the pulses of the two different pulse streams arranged at different positions within the respective bit slots, such that the pulses do not overlap in time but are still in the same bit slot. Alternatively however it can be achieved by having orthogonally polarised optical combiner inputs, with the received optical pulse streams having at least some components which will pass through the polarising elements.

As a result of this non-interferometric mixing of pulses, the total optical energy output from the optical combiner during any one bit slot is sum of the total optical energy received.

The optical combiner will usually take the form of an optical fibre coupler, a silica planar waveguide, or a bulk beam splitter.

Figure 1C:
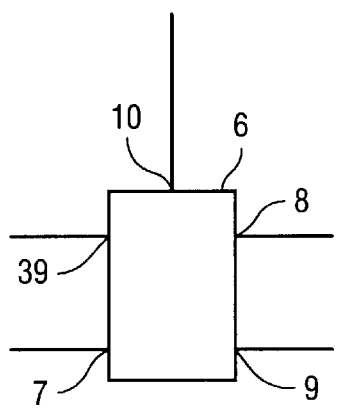
FIG. 1c shows a schematic representation of an all optical non-linear gate.

FIG. 1c shows an all optical non-linear gate 6 which is a form of non-linear optical switching element such as a fibre non-linear optical loop mirror (NOLM), a fibre NOLM with an offset semiconductor amplifier, or an integrated planar NOLM. Mach-Zender, Michaelson and time-division versions of these devices are also possible although will not be considered in detail in the specification. One specific type of optical switching element of this type is the terahertz optical asymmetric demultiplexers (TOADS), which are described in the paper entitled "Asymmetrical Optical Loop Mirror: analysis of an all-optical switch", Applied Optics, Volume 33, No. 29 1994.

The all optical gate has two gate inputs 7, 39, two gate outputs 8, 9 and a gate switching input 10. Each gate input 7, 39 is connected internally to a respective gate output 8, 9, with the connections depending on the state of the switch. Thus, when the gate is in an unswitched state, the gate input 7 is connected to the gate output 9 and gate input 39 is connected to gate output 8. However, when the gate is in a switched state, the gate input 7 is connected to the gate output 8 and the gate input 39 is connected to the gate output 9.

In operation, the state of the switch is controlled by the application of optical pulses to the gate switching input 10. This is achieved using an optical pulse stream comprising a number of bit slots, the stream containing a number of optical pulses. These optical pulses are received by the gate which operates to integrate the total optical energy received over a predetermined time period. From now on, it will be assumed that this time period corresponds to a single bit slot, although in certain circumstances, longer or shorter time periods may be preferable.

Thus, for example, if a single optical pulse has a total energy E, and a bit slot containing a single optical pulse was applied to the gate switching input 10, then a total energy E would be detected. However, if two optical pulses were present within a single bit slot, then the switching input would detect a total energy 2E equivalent to two optical pulses.

The gate has an approximately sinusoidal response to the total amount of energy received during the predetermined time period, such that if the total energy received is an odd integer multiple of the energy contained in one optical pulse, then the switch will enter the switched state so as to transfer any data received at one of the gate inputs 7, 39 to the respective gate output. The gate will return to the unswitched state at the start of the next bit slot. If an even integer multiple is received the switch will remain in the unswitched state.

There is however a limit to the number of optical pulses that can be detected during any one time period. Accordingly, to avoid miscalculation of the number of pulses received, it is preferably ensured that no more than two optical pulses will ever be received by the switch during a single bit slot. Consequently, the switch will only enter a switched state if a single optical pulse is received during the bit slot. Such a bit slot containing a single optical pulse for application to the gate switching input 10 is hereinafter referred to as a switching signal.

Thus, with none or two optical pulses applied to the gate switching input 10, during a bit slot, an optical pulse stream provided at the gate input 7 will pass through the all optical gate to the second gate output 9. However the application of a single optical pulse to the gate switching input 10 will act as a switching signal causing a single bit slot of the optical pulse stream applied to the gate input 7, to be diverted from the second gate output 9, to the first gate output 8. Any further bit slots in the input optical stream will continue to be output from the second gate output 9 unless further switching signals are received.

In logical terms, the gate 6 operates such that reception of a bit slot containing one optical pulse is equivalent to receiving a logical signal of one logical state, whilst reception of a bit slot containing no or two optical pulses is equivalent to receiving a logical signal of the complementary logical state.

Figure 1D:
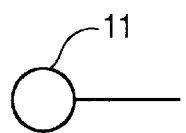
FIG. 1d shows a schematic representation of an optical, pulse source.

FIG. 1d shows an optical pulse source 11, which usually takes the form of a semiconductor laser producing pulses at a wavelength of approximately 1.5 micrometers. The pulse repetition rate is approximately 1 GHz with the laser providing 10 ps pulses after linear chirp compensation in a length of non-dispersive optical fibre, although pulse repetition rates of over 100 GHz are possible. Such a pulse source 11 will generally be configured to produce one of two optical pulse sequences. The first configuration, which will hereinafter be called a pulse stream generator generates an optical pulse stream with an optical pulse in every bit slot. The second configuration, which will hereinafter be called a sync pulse generator, generates an optical pulse stream with an optical pulse in one bit slot only.

Figure 1E:
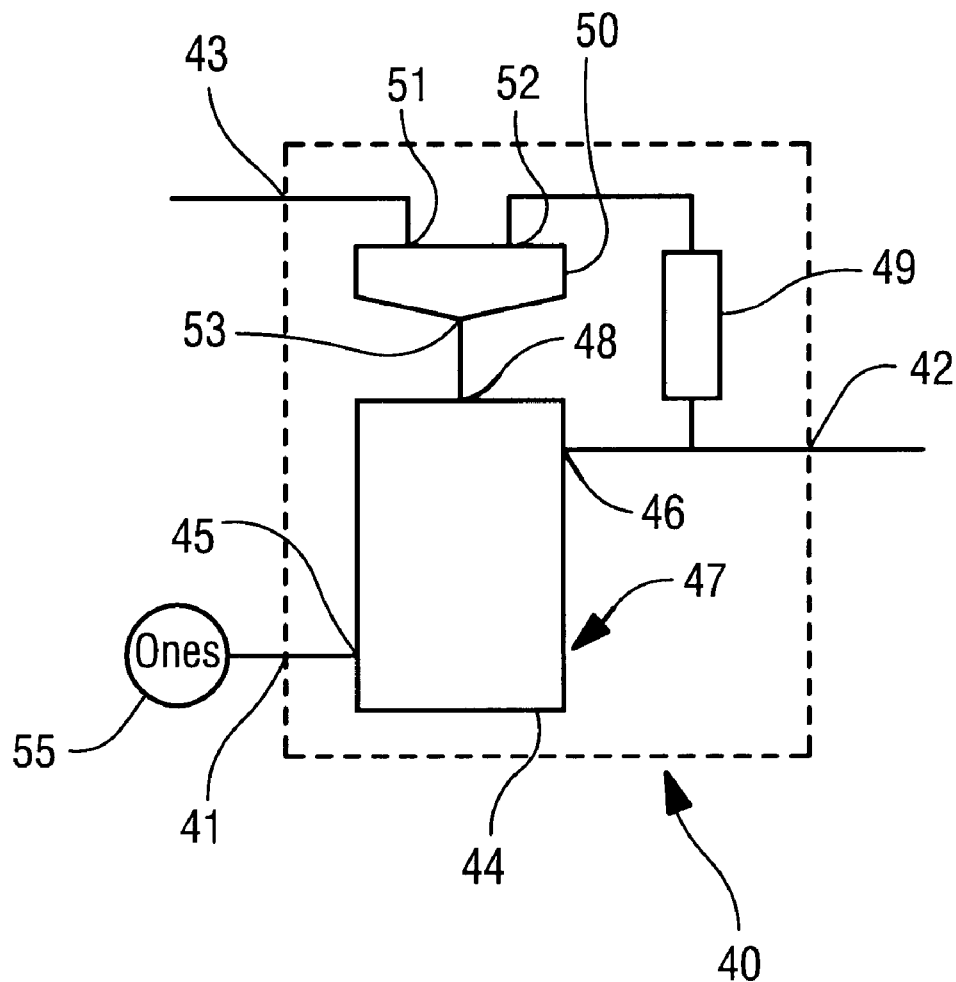
FIG. 1e shows a schematic representation of a regenerative memory.

FIG. 1e shows an N bit slot regenerative memory 40. The memory 40, which has a memory input port 41, a memory output port 42 and a memory word input port 43, comprises an all optical non-linear gate 44. The gate input 45 is connected via the memory input port 41 to a pulse stream generator 55 which generates a continuous stream of optical pulses. The first gate output 46 is connected to the memory output port 42 and, via a feedback loop with a delay line 49, to an all optical combiner 50.

The all optical combiner 50 has a combiner output 53 connected to the gate switching input 48 of the gate 44, along with two combiner inputs 51, 52. As described above, the optical combiner 50 and optical gate 44 act as an XOR gate. This is due to the gate 44 only being switched by the reception of a bit slot containing a single optical pulse which acts as a switching signal.

The first combiner input 51 is connected to the memory word input port 43, for receiving an N bit slot optical word to be stored, whilst the second combiner input 52 is connected to the first gate output port 46, via the delay line 49. The delay line 49 introduces a time delay equivalent to N bit slots to the data flow from the gate output to the combiner input.

Operation of the memory 40 will now be described. With no optical pulses applied to the memory word input 43, the stream of optical pulses supplied to the memory input port 41 will be output from the second gate output 47 of the gate 44. To store a word, which is data comprising an optical signal of N bit slots in length, the word is input to the memory word input 43 and transferred via the optical combiner 50 to the gate switching input 48.

The word acts as a series of switching signals. Thus as each bit slot of the word is applied to the switching input, it will cause a copy of contents of the bit slot to be output from the first gate output 46. So, for example, if the first bit slot contains an optical pulse, this will act as a switching signal causing a single optical pulse to be transferred from the optical pulse stream supplied to the gate input 45 to the first gate output 46. This optical pulse will then be output from the output port 42 with a copy of the pulse being fed back via the delay line 49, to the combiner 50.

As the delay line 49 introduces an N bit slot delay, this first bit slot containing an optical pulse will not reach the second combiner input 52 until all the N bit slots in the word have passed through the combiner 50.

Supposing the second bit slot of the word contains no optical pulse, then it does not act as a switching signal and the optical pulse in the corresponding bit slot in the input optical pulse stream will be transferred to the second gate output 47. Accordingly an empty bit slot will be output from the first gate output 46, which will again be fed back via the delay line to the second combiner input 52.

This process is repeated for all the N bit slots of the word such that a copy of the word is generated at the second gate output 46. As mentioned with respect to each bit slot, the word is copied, with one copy being available for output from the memory 40 at the memory output port 42, whilst the other copy is fed back to the optical combiner 50, via the delay line 49.

As the delay line 49 delays the transfer of the word by N bit slots, then the first bit slot of the copied word will reach the input 52 of the optical combiner immediately after the last bit slot of the word was originally input into the input 51 of the combiner 50. This copy of the word then acts as a further series of switching signals to generate further copies of the word.

If the word was only of M bit slots in length, where N>M, then the first bit slot of the copied word will reach the input 52 of the optical combiner N–M bit slots after the last bit slot of the M bit slot word was originally input into the input 51 of the combiner 50.

During the time after the arrival of the last bit slot of the M bit slot word, at the input 51, and before the arrival of the first bit slot of the copied word, no optical pulses are applied to the gate switching input 48. Accordingly, the application of an M bit slot length word to an N bit regenerative memory, is equivalent to applying an N bit slot word with the final N–M bit slots of the N bit slot word containing no optical pulses. Thus, the regenerative memory 40 stores an N bit slot word comprising the N bit slot word followed by a sequence of N M empty bit slots.

Consequently, a copy of the word constantly recirculates in the feed back loop acting as a set of switching signals to cause further copies of the word to be generated and output from the first gate output 46.

Figure 2:
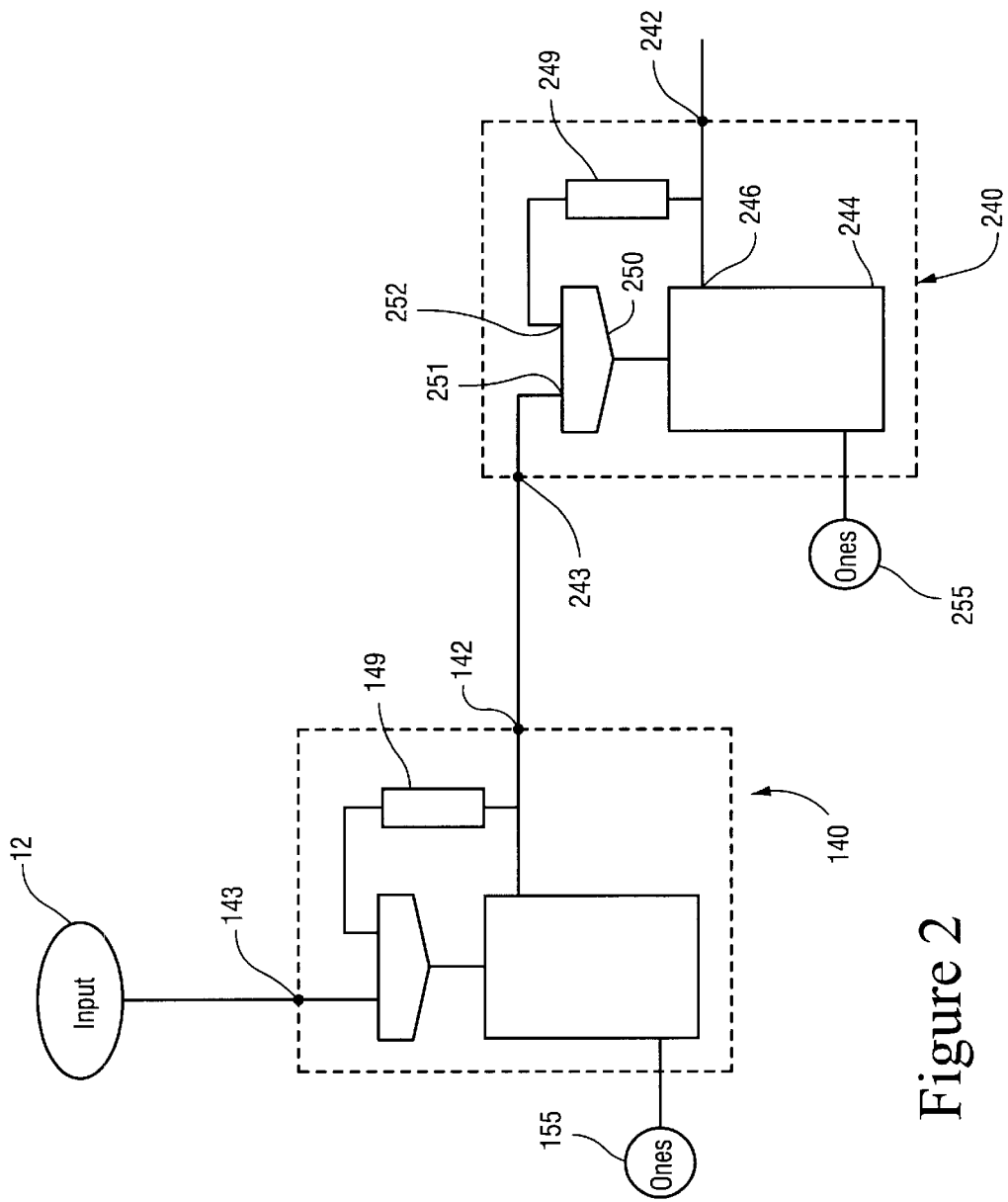
FIG. 2 shows a schematic representation of parity determining apparatus according to the present invention; and, FIG. 3 shows bit slot time lines indicating the presence of optical pulses at several locations around the parity determining apparatus of FIG. 2.

An example of parity determining apparatus according to the present invention is shown in FIG. 2.

As shown, the apparatus comprises two regenerative memories 140, 240 of the form shown in FIG. 1e. In the first regenerative memory 140, the delay line 149 is an L-bit slot delay line, whereas in the second regenerative memory 240, the delay line 249 is an L+1 bit slot delay line.

There is also provided an input 12 which generates an optical pulse stream comprising an optical binary word of W bit slots in length. The input is coupled to the memory word input port 143 of the L bit regenerative memory 140. The binary output port 142, of the L bit regenerative memory 140 is coupled to the memory word input port 243 of the L+1 regenerative memory 240. The parity word which indicates the parity of the word supplied by the input 12 is generated at the memory output port 242 of the L+1 regenerative memory 240.

Operation of the parity determining apparatus will now be described with reference to Table 1 and FIG. 3 which show the presence of optical pulses at different locations in the circuit.

TABLE 1

| Bit Slot | Input (12) | L bit memory Output Port (142) | Second Combiner Input (252) | L + 1 bit memory Output Port (242) |
|---|---|---|---|---|
| 1 | 1 | 1 | 0 | 1 |
| 2 | 0 | 0 | 0 | 0 |
| 3 | 1 | 1 | 0 | 1 |
| 4 | 0 | 0 | 0 | 0 |
| 5 | 0 | 0 | 0 | 0 |
| 6 | 1 | 1 | 0 | 1 |
| 7 | 0 | 0 | 0 | 0 |
| 8 | 0 | 0 | 0 | 0 |
| 9 | 0 | 0 | 0 | 0 |
| 10 | 0 | 0 | 0 | 0 |
| 11 | 0 | 1 | 0 | 1 |
| 12 | 0 | 0 | 1 | 1 |
| 13 | 0 | 1 | 0 | 1 |
| 14 | 0 | 0 | 1 | 1 |
| 15 | 0 | 0 | 0 | 0 |
| 16 | 0 | 1 | 0 | 1 |
| 17 | 0 | 0 | 1 | 1 |
| 18 | 0 | 0 | 0 | 0 |
| 19 | 0 | 0 | 0 | 0 |
| 20 | 0 | 0 | 0 | 0 |
| 21 | 0 | 1 | 0 | 1 |
| 22 | 0 | 0 | 1 | 1 |
| 23 | 0 | 1 | 1 | 0 |
| 24 | 0 | 0 | 1 | 1 |
| 25 | 0 | 0 | 1 | 1 |
| 26 | 0 | 1 | 0 | 1 |
| 27 | 0 | 0 | 1 | 1 |
| 28 | 0 | 0 | 1 | 1 |
| 29 | 0 | 0 | 0 | 0 |
| 30 | 0 | 0 | 0 | 0 |
| 31 | 0 | 1 | 0 | 1 |
| 32 | 0 | 0 | 1 | 1 |
| 33 | 0 | 1 | 1 | 0 |
| 34 | 0 | 0 | 0 | 0 |
| 35 | 0 | 0 | 1 | 1 |
| 36 | 0 | 1 | 1 | 0 |
| 37 | 0 | 0 | 1 | 1 |
| 38 | 0 | 0 | 1 | 1 |
| 39 | 0 | 0 | 1 | 1 |
| 40 | 0 | 0 | 0 | 0 |
| 41 | 0 | 1 | 0 | 1 |
| 42 | 0 | 0 | 1 | 1 |
| 43 | 0 | 1 | 1 | 0 |
| 44 | 0 | 0 | 0 | 0 |
| 45 | 0 | 0 | 0 | 0 |
| 46 | 0 | 1 | 1 | 0 |
| 47 | 0 | 0 | 0 | 0 |
| 48 | 0 | 0 | 1 | 1 |
| 49 | 0 | 0 | 1 | 1 |
| 50 | 0 | 0 | 1 | 1 |
| 51 | 0 | 1 | 0 | 1 |
| 52 | 0 | 0 | 1 | 1 |
| 53 | 0 | 1 | 1 | 0 |
| 54 | 0 | 0 | 0 | 0 |
| 55 | 0 | 0 | 0 | 0 |
| 56 | 0 | 1 | 0 | 1 |
| 57 | 0 | 0 | 0 | 0 |
| 58 | 0 | 0 | 0 | 0 |
| 59 | 0 | 0 | 1 | 1 |
| 60 | 0 | 0 | 1 | 1 |

In this example, W=4 bit slots, whereas L=10 bit slots.

Initially, the W bit slot binary word is applied to the memory word input port 143. The memory functions, as described with respect to FIG. 1e, to generate an output signal stream at the memory output port 142. This signal stream is a sequence of consecutive L bit slot length words, the first W bit slots of which comprise the W bit slot, the last L–W bit slots of which contain no optical pulses. This is equivalent to generating an output stream comprising the W bit slot word repeated at intervals of L bit slots.

Figure 3:
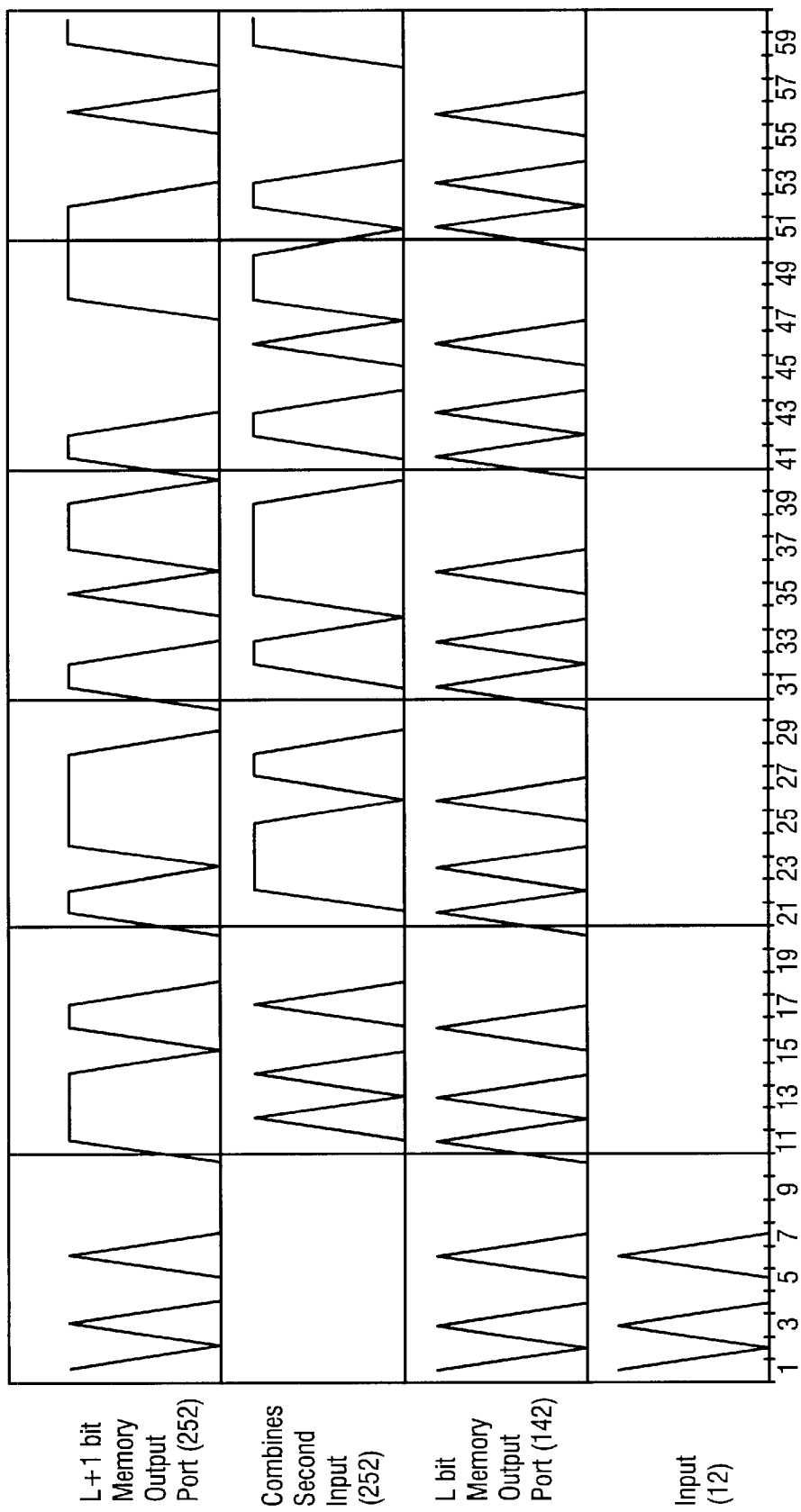

As shown in FIG. 3 and Table 1, the output signal stream generated at the memory output port 142 is transferred to the memory word input port 243, of the memory 240.

Initially with no other optical pulses present in the memory 240, the first L bit slot word to be received at the memory word input 243 is simply stored as described above with respect to memory 40. Accordingly, the word acts as a series of switching pulses causing a copy of the word to be generated at the gate output 246. Although this word is only a copy of the original L bit slot binary word generated by applying the W bit slot word to the L bit regenerative memory 240, the first bit slot (i.e. bit slot 1) represents the parity of the first bit slot of the original L bit slot word. Accordingly the signal stream generated at the gate output 246 is a parity word, the first bit slot of which represents the parity of the first bit slot of the original word. One copy of this parity word is output from the memory output port 242, whilst a second copy is transferred via the L+1 bit slot delay line to the second combiner input 252.

During bit slots 11–20, the second L bit slot word generated at the memory output port 142 is transferred to the first combiner input 251 of the memory 240. Offset by one bit slot with respect to this, the parity word generated at the first gate output 246 is transferred to the second combiner input 252, during bit slots 12–21.

As described above, the combiner 250 and the non-linear gate 244 act to generate the exclusive OR of the bit slots applied to the first and second combiner inputs 251, 252 respectively, at the gate output 246. Accordingly, the signal stream output from the gate output 246 during bit slots 11–20 represents the XOR combination of the original L bit slot word and the offset parity word generated by the memory 240.

This XOR combination is generated at the gate output 246. Again a copy of this output signal stream is output from the memory output port 242, whilst a second copy is applied to the second combiner input 252, via the delay line 249.

The XOR combination word generated during bit slots 11–20 represents an updated parity word in which the first two bit slots of the parity word represent the parity of the first two bit slots of the original L bit slot length word.

By repeating this process, with the most recently generated parity word being offset by a single bit slot and XOR-ed with the original L bit slot word, the parity word representing the parity of all W bit slots of the W bit slot word, can be generated.

A general form of the above described example is shown in Table 2, in which the W bit slot binary word has bit slots with values $W_1$, $W_2$, $W_3$, $W_4$.

As is evident from the table, after P applications of the original L bit slot word to the L+1 bit regenerative memory, the first P bit slots of the parity word generated at the memory output port 242 represent the parity of the first P bit slots of the original L bit word.

TABLE 2

| Bit Slot | Input (12) | L bit memory Output Port (142) | Second Combiner Input (252) | L + 1 bit memory Output Port (242) |
| --- | --- | --- | --- | --- |
| 1 | $W_1$ | $W_1$ | 0 | $W_1$ |
| 2 | $W_2$ | $W_2$ | 0 | $W_2$ |
| 3 | $W_3$ | $W_3$ | 0 | $W_3$ |
| 4 | $W_4$ | $W_4$ | 0 | $W_4$ |
| 5 | 0 | 0 | 0 | 0 |
| 6 | 0 | 0 | 0 | 0 |
| 7 | 0 | 0 | 0 | 0 |
| 8 | 0 | 0 | 0 | 0 |
| 9 | 0 | 0 | 0 | 0 |
| 10 | 0 | 0 | 0 | 0 |
| 11 | 0 | $W_1$ | 0 | $W_1$ |
| 12 | 0 | $W_2$ | $W_1$ | $W_1$ XOR $W_2$ |
| 13 | 0 | $W_3$ | $W_2$ | $W_2$ XOR $W_3$ |
| 14 | 0 | $W_4$ | $W_3$ | $W_3$ XOR $W_4$ |
| 15 | 0 | 0 | $W_4$ | $W_4$ |
| 16 | 0 | 0 | 0 | 0 |
| 17 | 0 | 0 | 0 | 0 |
| 18 | 0 | 0 | 0 | 0 |
| 19 | 0 | 0 | 0 | 0 |
| 20 | 0 | 0 | 0 | 0 |
| 21 | 0 | $W_1$ | 0 | $W_1$ |
| 22 | 0 | $W_2$ | $W_1$ | $W_1$ XOR $W_2$ |
| 23 | 0 | $W_3$ | $W_1$ XOR $W_2$ | $W_1$ XOR $W_2$ XOR $W_3$ |
| 24 | 0 | $W_4$ | $W_2$ XOR $W_3$ | $W_2$ XOR $W_3$ XOR $W_4$ |
| 25 | 0 | 0 | $W_3$ XOR $W_4$ | $W_3$ XOR $W_4$ |
| 26 | 0 | 0 | $W_4$ | $W_4$ |
| 27 | 0 | 0 | 0 | 0 |
| 28 | 0 | 0 | 0 | 0 |
| 29 | 0 | 0 | 0 | 0 |
| 30 | 0 | 0 | 0 | 0 |
| 31 | 0 | $W_1$ | 0 | $W_1$ |
| 32 | 0 | $W_2$ | $W_1$ | $W_1$ XOR $W_2$ |
| 33 | 0 | $W_3$ | $W_1$ XOR $W_2$ | $W_1$ XOR $W_2$ XOR $W_3$ |
| 34 | 0 | $W_4$ | $W_1$ XOR $W_2$ XOR $W_3$ | $W_1$ XOR $W_2$ XOR $W_3$ XOR $W_4$ |
| 35 | 0 | 0 | $W_2$ XOR $W_3$ XOR $W_4$ | $W_2$ XOR $W_3$ XOR $W_4$ |
| 36 | 0 | 0 | $W_3$ XOR $W_4$ | $W_3$ XOR $W_4$ |
| 37 | 0 | 0 | $W_4$ | $W_4$ |

TABLE 2-continued

| Bit Slot | Input (12) | L bit memory Output Port (142) | Second Combiner Input (252) | L + 1 bit memory Output Port (242) |
|---|---|---|---|---|
| 38 | 0 | 0 | 0 | 0 |
| 39 | 0 | 0 | 0 | 0 |
| 40 | 0 | 0 | 0 | 0 |
| 41 | 0 | $W_1$ | 0 | $W_1$ |
| 42 | 0 | $W_2$ | $W_1$ | $W_1$ XOR $W_2$ |
| 43 | 0 | $W_3$ | $W_1$ XOR $W_2$ | $W_1$ XOR $W_2$ XOR $W_3$ |
| 44 | 0 | $W_4$ | $W_1$ XOR $W_2$ XOR $W_3$ | $W_1$ XOR $W_2$ XOR $W_3$ XOR $W_4$ |
| 45 | 0 | 0 | $W_1$ XOR $W_2$ XOR $W_3$ XOR $W_4$ | $W_1$ XOR $W_2$ XOR $W_3$ XOR $W_4$ |
| 46 | 0 | 0 | $W_2$ XOR $W_3$ XOR $W_4$ | $W_2$ XOR $W_3$ XOR $W_4$ |
| 47 | 0 | 0 | $W_3$ XOR $W_4$ | $W_3$ XOR $W_4$ |
| 48 | 0 | 0 | $W_4$ | $W_4$ |
| 49 | 0 | 0 | 0 | 0 |
| 50 | 0 | 0 | 0 | 0 |
| 51 | 0 | $W_1$ | 0 | $W_1$ |
| 52 | 0 | $W_2$ | $W_1$ | $W_1$ XOR $W_2$ |
| 53 | 0 | $W_3$ | $W_1$ XOR $W_2$ | $W_1$ XOR $W_2$ XOR $W_3$ |
| 54 | 0 | $W_4$ | $W_1$ XOR $W_2$ XOR $W_3$ | $W_1$ XOR $W_2$ XOR $W_3$ XOR $W_4$ |
| 55 | 0 | 0 | $W_1$ XOR $W_2$ XOR $W_3$ XOR $W_4$ | $W_1$ XOR $W_2$ XOR $W_3$ XOR $W_4$ |
| 56 | 0 | 0 | $W_1$ XOR $W_2$ XOR $W_3$ XOR $W_4$ | $W_1$ XOR $W_2$ XOR $W_3$ XOR $W_4$ |
| 57 | 0 | 0 | $W_2$ XOR $W_3$ XOR $W_4$ | $W_2$ XOR $W_3$ XOR $W_4$ |
| 58 | 0 | 0 | $W_3$ XOR $W_4$ | $W_3$ XOR $W_4$ |
| 59 | 0 | 0 | $W_4$ | $W_4$ |
| 60 | 0 | 0 | 0 | 0 |
| 61 | 0 | $W_1$ | 0 | $W_1$ |
| 62 | 0 | $W_2$ | $W_1$ | $W_1$ XOR $W_2$ |
| 63 | 0 | $W_3$ | $W_1$ XOR $W_2$ | $W_1$ XOR $W_2$ XOR $W_3$ |
| 64 | 0 | $W_4$ | $W_1$ XOR $W_2$ XOR $W_3$ | $W_1$ XOR $W_2$ XOR $W_3$ XOR $W_4$ |
| 65 | 0 | 0 | $W_1$ XOR $W_2$ XOR $W_3$ XOR $W_4$ | $W_1$ XOR $W_2$ XOR $W_3$ XOR $W_4$ |
| 66 | 0 | 0 | $W_1$ XOR $W_2$ XOR $W_3$ XOR $W_4$ | $W_1$ XOR $W_2$ XOR $W_3$ XOR $W_4$ |
| 67 | 0 | 0 | $W_1$ XOR $W_2$ XOR $W_3$ XOR $W_4$ | $W_1$ XOR $W_2$ XOR $W_3$ XOR $W_4$ |
| 68 | 0 | 0 | $W_2$ XOR $W_3$ XOR $W_4$ | $W_2$ XOR $W_3$ XOR $W_4$ |
| 69 | 0 | 0 | $W_3$ XOR $W_4$ | $W_3$ XOR $W_4$ |
| 70 | 0 | 0 | $W_4$ | $W_4$ |
| 71 | 0 | $W_1$ | 0 | $W_1$ |
| 72 | 0 | $W_2$ | $W_1$ | $W_1$ XOR $W_2$ |
| 73 | 0 | $W_3$ | $W_1$ XOR $W_2$ | $W_1$ XOR $W_2$ XOR $W_3$ |
| 74 | 0 | $W_4$ | $W_1$ XOR $W_2$ XOR $W_3$ | $W_1$ XOR $W_2$ XOR $W_3$ XOR $W_4$ |
| 75 | 0 | 0 | $W_1$ XOR $W_2$ XOR $W_3$ XOR $W_4$ | $W_1$ XOR $W_2$ XOR $W_3$ XOR $W_4$ |
| 76 | 0 | 0 | $W_1$ XOR $W_2$ XOR $W_3$ XOR $W_4$ | $W_1$ XOR $W_2$ XOR $W_3$ XOR $W_4$ |
| 77 | 0 | 0 | $W_1$ XOR $W_2$ XOR $W_3$ XOR $W_4$ | $W_1$ XOR $W_2$ XOR $W_3$ XOR $W_4$ |
| 78 | 0 | 0 | $W_1$ XOR $W_2$ XOR $W_3$ XOR $W_4$ | $W_1$ XOR $W_2$ XOR $W_3$ XOR $W_4$ |
| 79 | 0 | 0 | $W_2$ XOR $W_3$ XOR $W_4$ | $W_2$ XOR $W_3$ XOR $W_4$ |
| 80 | 0 | 0 | $W_3$ XOR $W_4$ | $W_3$ XOR $W_4$ |
| 81 | 0 | $W_1$ | $W_4$ | $W_1$ XOR $W_4$ |
| 82 | 0 | $W_2$ | $W_1$ | $W_1$ XOR $W_2$ |
| 83 | 0 | $W_3$ | $W_1$ XOR $W_2$ | $W_1$ XOR $W_2$ XOR $W_3$ |
| 84 | 0 | $W_4$ | $W_1$ XOR $W_2$ XOR $W_3$ | $W_1$ XOR $W_2$ XOR $W_3$ XOR $W_4$ |
| 85 | 0 | 0 | $W_1$ XOR $W_2$ XOR $W_3$ XOR $W_4$ | $W_1$ XOR $W_2$ XOR $W_3$ XOR $W_4$ |
| 86 | 0 | 0 | $W_1$ XOR $W_2$ XOR $W_3$ XOR $W_4$ | $W_1$ XOR $W_2$ XOR $W_3$ XOR $W_4$ |
| 87 | 0 | 0 | $W_1$ XOR $W_2$ XOR $W_3$ XOR $W_4$ | $W_1$ XOR $W_2$ XOR $W_3$ XOR $W_4$ |
| 88 | 0 | 0 | $W_1$ XOR $W_2$ XOR $W_3$ XOR $W_4$ | $W_1$ XOR $W_2$ XOR $W_3$ XOR $W_4$ |
| 89 | 0 | 0 | $W_1$ XOR $W_2$ XOR $W_3$ XOR $W_4$ | $W_1$ XOR $W_2$ XOR $W_3$ XOR $W_4$ |
| 90 | 0 | 0 | $W_2$ XOR $W_3$ XOR $W_4$ | $W_2$ XOR $W_3$ XOR $W_4$ |

There are however also an additional P−1 bit slots, following the P parity representing bit slots, that do not represent the parity of the original word but arise due to the feedback procedure. If the feeding back is continued, the final bit slot in the parity word is eventually fed back and combined with the first bit slot of a later L bit slot word, as shown during bit slot 81.

Accordingly, the last successful parity determination will occur when the length of the parity word is greater than that of the L bit slot length word such that:

$$W-1+P>L$$

or $$L=W+P-2$$

where: P=the number of parity bit slots to be determined.

Thus, to ensure that the parity of a desired number of bit slots can be determined, it is necessary to ensure that the number of bit slots L in the original word is such that:

$$L \geq W+P-2$$

Generally a large value of L is used to ensure that the desired number of parity bit slots P can be obtained and to allow the parity word to recirculate in the L bit slot regenerative memory 240.

Table 2 shows that the parity of the Pth bit slot of a W bit slot binary word is given by generating the XOR combination of the Pth bit slot with all preceding bit slots (i.e. $W_P$ XOR $W_{P-1}$ XOR ... XOR $W_2$ XOR $W_1$ for the general use).

Accordingly, the parity word may be determined using a one bit regenerative memory. By applying W bit slot word to the memory, each bit slot will be XORed with the XOR combination of all previous bit slots. Accordingly the application of the Pth bit slot of the W bit slot binary word result in the generation of the Pth bit slot of the parity word. This is equivalent to the situation in which L=0. Suitable apparatus for carrying this out is described in our copending application Ser. No. GB 9719895.6.

It will also be realised that the invention may be implemented using an L−1 bit slot delay instead of an L+1 bit slot delay as this will still result in the generation of the XOR combination of the Pth bit slot with each of the preceding bit slots of the W bit slot binary word. With this arrangement, the first bit slot of the parity word will eventually be combined with the last bit slot of the W bit slot word. This will occur when the number of parity representing bit slots P that have been determined is greater than the number of empty bit slots in the L bit slot word such that:

$$P > L-W$$

or $$P = L-W+1$$

Accordingly the number of bit slots required in the L bit slot word is given by:

$$L \geq W+P-1$$

An example of the operation of a system using an L−1 bit slot delay line instead of an L+1 bit slot delay line is shown in Table 3. In this example, L=7 and W=4. It can be seen that due to the parity word recirculating in an L−1 bit slot memory, the parity word can only be a maximum of L−1=6 bit slots in length.

memory 40, shown in FIG. 1*e*, by replacing the pulse stream generator 55 with apparatus that provides a pulse stream including at least N empty bit slots. The N empty bit slots are transferred to the gate output 46 when switching pulses are received at the gate switching input 48. As a result, any optical pulses recirculating in the feed back loop, via the delay line 49, are replaced thus resetting the contents of the memory.

Accordingly, the same principle can be used in the present invention to reset parity determining apparatus. This could be achieved by replacing the pulse stream generators 155 and 255 with apparatus that provides a pulse stream including at least L+1 empty bit slots. This may be achieved using the window generator described in our copending application Ser. No. GB 9719895.6.

What is claimed is:

1. Parity determining apparatus for determining the parity of a binary word, the binary word being represented by a sequence of W optical bit slots, each bit slot defining a respective one of first and second complementary logical states, the apparatus comprising:

an input pulse stream generator which generates copies of the W bit slot word;

a combining means which receives first and second binary words, offsets the first and second binary words by one bit slot and combines the relatively offset first and second binary words to form a combination word; and, means for applying P times in succession a copy of the W bit slot binary word and the previously generated combination word to combining means, whereby the parity of the first P bit slots of the W bit slot word are given by the first P bit slots of the resultant combination word, the first combination word comprising a sequence of optical bit slots having the same logical state.

TABLE 3

| Bit Slot | Input (12) | L bit memory Output Port (142) | Second Combiner Input (252) | L − 1 bit memory Output Port |
|---|---|---|---|---|
| 1 | $W_1$ | $W_1$ | 0 | $W_1$ |
| 2 | $W_2$ | $W_2$ | 0 | $W_2$ |
| 3 | $W_3$ | $W_3$ | 0 | $W_3$ |
| 4 | $W_4$ | $W_4$ | 0 | $W_4$ |
| 5 | 0 | 0 | 0 | 0 |
| 6 | 0 | 0 | 0 | 0 |
| 7 | 0 | 0 | $W_1$ | $W_1$ |
| 8 | 0 | $W_1$ | $W_2$ | $W_1$ XOR $W_2$ |
| 9 | 0 | $W_2$ | $W_3$ | $W_2$ XOR $W_3$ |
| 10 | 0 | $W_3$ | $W_4$ | $W_3$ XOR $W_4$ |
| 11 | 0 | $W_4$ | 0 | $W_4$ |
| 12 | 0 | 0 | 0 | 0 |
| 13 | 0 | 0 | $W_1$ | $W_1$ |
| 14 | 0 | 0 | $W_1$ XOR $W_2$ | $W_1$ XOR $W_2$ |
| 15 | 0 | $W_1$ | $W_2$ XOR $W_3$ | $W_1$ XOR $W_2$ XOR $W_3$ |
| 16 | 0 | $W_2$ | $W_3$ XOR $W_4$ | $W_2$ XOR $W_3$ XOR $W_4$ |
| 17 | 0 | $W_3$ | $W_4$ | $W_3$ XOR $W_4$ |
| 18 | 0 | $W_4$ | 0 | $W_4$ |
| 19 | 0 | 0 | $W_1$ | $W_1$ |
| 20 | 0 | 0 | $W_1$ XOR $W_2$ | $W_1$ XOR $W_2$ |
| 21 | 0 | 0 | $W_1$ XOR $W_2$ XOR $W_3$ | $W_1$ XOR $W_2$ XOR $W_3$ |
| 22 | 0 | $W_1$ | $W_2$ XOR $W_3$ XOR $W_4$ | $W_1$ XOR $W_2$ XOR $W_3$ XOR $W_4$ |
| 23 | 0 | $W_2$ | $W_3$ XOR $W_4$ | $W_2$ XOR $W_3$ XOR $W_4$ |
| 24 | 0 | $W_3$ | $W_4$ | $W_3$ XOR $W_4$ |
| 25 | 0 | $W_4$ | $W_1$ | $W_1$ XOR $W_4$ |
| 26 | 0 | 0 | $W_1$ XOR $W_2$ | $W_1$ XOR $W_2$ |
| 27 | 0 | 0 | $W_1$ XOR $W_2$ XOR $W_3$ | $W_1$ XOR $W_2$ XOR $W_3$ |
| 28 | 0 | 0 | $W_1$ XOR $W_2$ XOR $W_3$ XOR $W_4$ | $W_1$ XOR $W_2$ XOR $W_3$ XOR $W_4$ |

Also described in our copending application Ser. No. GB 9719895.6 is a method of resetting the N bit regenerative 2. Parity determining apparatus according to claim 1, wherein the means for applying applies the copy of the W bit slot binary word and the previously generated combination word to the combining means.

3. Parity determining apparatus according to claim 2, wherein the input pulse stream generator generates an input optical pulse stream comprising the W optical bit slot word repeated at intervals of L bit slots.

4. Parity determining apparatus according to claim 3, wherein the combining means comprises:
an optical combiner having first and second combiner inputs, and a combiner output which generates a combined optical signal stream representing the combination of optical bit slots applied to the first and second combiner inputs respectively; and,
an L−1 bit slot delay line, wherein the combiner output is coupled to the second combiner input via the L−1 bit slot delay line such that the L−1 bit slot delay line constitutes the means for applying, and wherein the input optical pulse stream is applied to the first optical combiner input.

5. Parity determining apparatus according to claim 4, the combining means further comprising an optical pulse source which generates optical pulses in successive bit slots, each optical pulse representing a logical state; and, an all optical non-linear gate, the non-linear gate comprising:
a gate input coupled to the optical pulse source;
a gate output, coupled to the L−1 bit slot delay line, which generates a gate output stream; and,
a gate switching input coupled to the combiner output, wherein the application of a switching signal to the gate switching input selectively switches a connection between the gate input and the gate output so as to change the logical state of the gate output stream for a time interval corresponding to a single bit slot.

6. Parity determining apparatus according to claim 4, wherein L≧W+P−1.

7. Parity determining apparatus according to claim 3, wherein the combining means comprises:
an optical combiner having first and second combiner inputs, and a combiner output which generates a combined optical signal stream representing the combination of optical bit slots applied to the first and second combiner inputs respectively; and,
an L+1 bit slot delay line, wherein the combiner output is coupled to the second combiner input via the L+1 bit slot delay line such that the L+1 bit slot delay line constitutes the means for applying, and wherein the input optical pulse stream is applied to the first optical combiner input.

8. Parity determining apparatus according to claim 7, wherein L≧W+P−2.

9. Parity determining apparatus according to claim 7, the combining means further comprising an optical pulse source which generates optical pulses in successive bit slots, each optical pulse representing a logical state; and, an all optical non-linear gate; the non-linear gate comprising:
a gate input coupled to the optical pulse source;
a gate output, coupled to the L−1 bit slot delay line, which generates a gate output stream; and,
a gate switching input coupled to the combiner output, wherein the application of a switching signal to the gate switching input selectively switches a connection between the gate input and the gate output so as to change the logical state of the gate output stream for a time interval corresponding to a single bit slot.

10. Parity determining apparatus according to claim 9, wherein the combined optical signal stream acts as a series of switching signals such that the gate output stream is a copy of the combined signal stream.

11. Parity determining apparatus according to claim 10, wherein each switching signal comprises a single optical pulse in a bit slot.

12. Parity determining apparatus according to claim 1, wherein the input pulse stream generator comprises:
an optical word generator which generates the W optical bit slot word; and,
an L bit regenerative memory having a memory word input which is coupled to the optical word generator to receive the W bit slot word to be stored, and a memory word output which generates the input optical pulse stream.

13. Parity determining apparatus according to claim 12, the apparatus further comprising an optical pulse source which generates optical pulses in successive bit slots, wherein the L bit regenerative memory further comprises an input coupled to the optical pulse source which receives the generated optical pulses.

14. Parity determining apparatus according to claim 1, wherein a bit slot having the second logical state contains a single optical pulse.

15. Parity determining apparatus according to claim 1, wherein the first combination word comprises a sequence of optical bit slots having the first logical state.

16. A method for determining the parity of a binary word, the binary word being represented by a sequence of W optical bit slots, each bit slot defining a respective one of first and second complementary logical states, the method comprising:
generating copies of the W bit slot word;
forming a combination word from first and second binary words by offsetting the first and second binary words by one bit slot and combining the relatively offset first and second binary words; and,
forming the combination word P times in succession from a copy of the W bit slot binary word and the previously generated combination word, whereby the parity of the first P bit slots of the W bit slot word are given by the first P bit slots of the resultant combination word, the first combination word comprising a sequence of optical bit slots having the same logical state.

17. A method according to claim 16, wherein the copies of the W bit slot word are generated as an input optical pulse stream comprising the W optical bit slot word repeated at intervals of L bit slots.

18. A method according to claim 17, wherein the copy of the W bit slot binary word and the previously generated combination word, are offset by one bit slot by offsetting the previously generated combination word by L+1 bit slots with respect to the input optical pulse stream and, combining the offset previously generated combination word with the input optical signal stream.

19. A method according to claim 18, wherein L≧W+P−2.

20. A method according to claim 17, wherein the copy of the W bit slot binary word and the previously generated combination word, are offset by one bit slot by offsetting the previously generated combination word by L−1 bit slots with respect to the input optical pulse stream and, combining the offset previously generated combination word with the input optical signal stream.

21. A method according to claim 20, wherein L≧W+P−1.

22. A method according to any of claim 16, wherein a bit slot having the second logical state contains a single optical pulse.

23. A method according to any of claim 17, wherein the first combination word comprises a sequence of optical bit slots having the first logical state.

* * * * *